Dec. 29, 1959  D. P. HART  2,919,255
INTERPOLYMER OF EPOXY RESIN, POLYAMIDE
RESIN AND POLYSULFIDE RESIN
Filed March 27, 1956

INVENTOR.
DONALD P. HART
BY
Oscar Spencer
ATTORNEY

United States Patent Office 2,919,255
Patented Dec. 29, 1959

2,919,255

INTERPOLYMER OF EPOXY RESIN, POLYAMIDE RESIN AND POLYSULFIDE RESIN

Donald P. Hart, Allison Park, Pa., assignor to Pittsburgh Plate Glass Company, a corporation of Pennsylvania Application March 27, 1956, Serial No. 574,120

8 Claims. (Cl. 260—23)

This invention relates to a thermosetting system containing a ternary interpolymer of polyether resin, a polyamide resin and a polysulfide resin. The invention has particular relation to a system of the foregoing type which has outstanding value as a coating agent or bonding agent for various highly exacting applications especially in the container field.

It has heretofore been recognized that valuable resins termed polyether or epoxy resins useful for many applications in the coating art could be prepared by reaction of polyhydric phenols such as bisphenol and epichlorohydrin in the presence of an alkaline agent such as sodium hydroxide. These are termed polyether or epoxy resins. It has also been recognized that valuable resins could be prepared by appropriate condensation or esterification of long chain dicarboxylic acids and diamines.

It has further been recognized that polyamide resins could be blended with or interpolymerized with polyether resins. The foregoing resins were valuable for many applications. However, for certain exacting applications such as for the coating or the seaming of such containers as sheet metal food containers, they were not entirely satisfactory. In particular, they often tend to be weak in tensile strength or in adhesion to the metal or in cohesion or in flexibility or in elongation.

This invention comprises the discovery that valuable resin products may be obtained by mixing and reacting together a polyether type resin, a liquid polyamide type resin a liquid organic polysulfide resin to provide a ternary thermoset interpolymer. In many instances, the resultant products are capable of curing to a state in which they possess exceptionally high extensibility, flexibility, exceptionally high mechanical strength, unusually good adherence to many metals such as aluminum, iron or steel, are heat resistant, are inert with respect to most chemicals and are highly insoluble in most solvents. They also possess little or no odor and are substantially tasteless. These are all properties which are highly desirable in such exacting uses as in cements for the seams of containers for food products, chemical solvents and many other applications. Needless to say, these are among the more exacting applications and are emphasized at this time for that reason. Obviously, the materials are useful for many other less exacting applications as a matter of course.

For purposes of the present invention, exceptionally good results have been obtained by use of polyether resins obtained by reacting epichlorohydrin and a phenol substituted alkane containing unsaturated side chains in the phenolic nuclei as disclosed in a copending application to Roger M. Christenson and William C. Bean, Serial No. 471,494, filed November 26, 1954. This compound may be represented by the following formula:

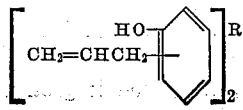

where R is alkane as represented by propane or other aliphatic hydrocarbon group. Examples illustrating the preparation of such preferred polyether resins will subsequently be included. These products when employed in the resins as herein disclosed, have an unusually high degree of elongation and flexibility and have other properties adapting them for use in the ternary interpolymers of this invention.

More desirable polyamide resins suitable for blending with the polyether components usually comprise the liquid reaction products of di- or triamines and such long chain dicarboxylic acids as the so-called dimer acids obtained by addition reaction of such drying oil acids as linseed oil acids, soya bean oil acids and the like. These polyamides are disclosed in U.S. patents:

2,462,053
2,695,908
2,705,223
2,707,708

The dimer acids obviously contain 2×17 or 34 carbon atoms in the hydrocarbon moiety.

They may be replaced by other long chain acids containing 20 or more carbon atoms in the chain interconnecting the carboxyls. The liquid polyamides or polyamides which are soluble in appropriate solvents are particularly desirable for use in the practice of the invention. The polyamides, in addition to being liquid or at least soluble, should also contain an excess of

or —$NH_2$ groups containing active hydrogen and being adapted to react with the epoxy resin. The latter also reacts with the polysulfide. The available groups may be provided by incorporation of an excess of a diamine or by use of a triamine or even a higher amine containing an excess of available —$NH_2$ groups. United States Patents 2,707,708 and 2,705,223, discloses polyamides made from polyethylene polyamines.

The organic polysulfide resin component of the interpolymer preferably is liquid, or can be rendered liquid by means of a solvent or by application of heat in a temperature below that of charring or decomposition of the interpolymerizable mixture. Those resins sold under the trade name of Thiokol and especially those liquid resins sold under that trade name are successful in combination with polyether resins and polyamide resins in accordance with the provisions of this invention. The organic polysulfide resins are reaction products of an organic compound containing a plurality of halogen atoms and an alkaline material containing a plurality of sulfur atoms and being represented by sodium tetrasulfide.

Various relative proportions of polyether resins, the polyamide resins and the organic polysulfide resins may be employed in making up the thermoset resin. The following are suggested as being approximate ranges of proportions:

| | Parts by weight |
|---|---|
| Polyether resins | 5 |
| Polyamide resins | 1 to 10 |
| Polysulfide resins | 0.2 to 6 |

The foregoing components may be mixed together merely by agitation. After all components are mixed, it is usually preferable to apply and cure the mixture within a few hours or before the liquid mixture can set prematurely. The polyamide component and the polysulfide may be mixed as a separate package which is relatively stable. This package is added at the desired time to the polyether component which constitutes a second package. The mixture resulting from blending the two packages should then be applied and cured within a short time in order to prevent premature setting. Interpolymerization of the liquid mixture to form a solid, thermoset resin will often proceed relatively rapidly even at room temperature or below and will proceed to completion at 60° C. or above in a matter of a few minutes. At 180° C. or above, it often proceeds to completion in a matter of a few seconds.

The preparation of polyethers of bis(allylphenyl)alkanes is not believed to be described in the published art. The preparation of such materials suitable for mixing and curing with polyamides and organic polysulfides is adequately described in the aforementioned application to Christenson and Bean. The following example illustrates the preparation of this material upon a commercial scale.

Example A

A solution is prepared comprising 4.4 pounds of sodium hydroxide dissolved in 27.8 pounds of water. To this solution is added 12.7 pounds of 2,2-bis(4-hydroxyphenyl)dimethylmethane known under the trade name of Bisphenol A. The mixture also includes 25 grams of $Na_2S_2O_4$ and 2,2-allyl chloride in an amount of approximately 2 moles per mole of 2,2-bis(4-hydroxyphenyl)dimethylmethane. The mixture tends to heat up exothermically and is cooled to 100° F. The mixture is cooled and acidified with phosphoric acid and the water layer is decanted off. The resultant product is 2,2-bis(allyloxyphenyl)dimethylmethane. This product is rearranged to form the desired 2,2-bis(4-hydroxy-3-allylphenyl)dimethylmethane as follows:

A mixture is prepared comprising 108.2 pounds of the indicated allyloxyphenyl propane and 21 pounds of xylene. This mixture is heated with azeotropic distillation of water. The dried mixture is then neutralized with sodium carbonate and is refluxed for 7 hours at 355° F. The product is 2,2-bis(4-hydroxy-3-allylphenyl)dimethylmethane.

In order to form the polyether or epoxy resin suitable to receive additions of polyamides and organic polysulfides, the 2,2-bis(4-hydroxy-3-allylphenyl)dimethylmethane as thus obtained and in an amount of 14.6 pounds is incorporated with 29 pounds of epichlorohydrin. To the mixture is added 638 grams of water and 296 grams of sodium hydroxide. The mixture is heated to 165° F. and the temperature subsequently rises exothermically to 200° F. to 210° F. The addition of water and sodium hydroxide is repeated three times. The mixture is refluxed for 1 hour and is washed with 19 pounds of water. The water layer is removed and the polyether of 2,2-bis(4-hydroxy-3-allylphenyl)dimethylmethane and epichlorohydrin is distilled under vacuum, then filtered.

The product obtained has an epoxy value of about 300, a viscosity of Y to Z on the Gardner scale and is of a solids content of 96 to 100 percent. This polyether or epoxy is excellently adapted for mixing with polyamides and organic polysulfides as already described to provide a product which cures within a few hours even at room temperature and which is valuable as a coating agent or seam cement for sheet metal containers and for many other applications.

The blending and curing of this liquid resin with a polyamide and an organic polysulfide resin is illustrated by the following examples:

Example I

In this example, the polyether resin corresponds to that described in Example A. The polyamide employed as a modifier of the polyether is a commercial product sold by the General Mills Corporation called Polyamide 115. This is understood to be the polyamide of dilinoleic acid (a dimer acid) and ethylene diamine probably with other amines such as tertiary amines and contains active free amine groups. The molecular weight is understood to be in a range of about 3,000 to 10,000.

The organic polysulfide in this example is a commercial product known as Thiokol LP-3 which is a reaction product of bis(2-chloroethyl)formal and sodium polysulfide of a molecular weight of about 4,000 and a viscosity of about 1,000 centipoises. It is understood to be manufactured under the provisions of U.S. Patents 1,890,191 and 2,216,044.

The reaction mixture comprises:

|  | Parts by weight |
|---|---|
| Allyl epoxy resin | 5 |
| Polyamide resin | 3 |
| Organic polysulfide | 1 |

This mixture has a pot life of about 2 to 2½ hours at room temperature. At 60° C. the pot life is 20 minutes.

The foregoing mixture, before cure, has a viscosity of about 25,000 centipoises. If a lower viscosity is desired, the same can be obtained without substantially altering the other properties of the resin by the addition to the mixture about 10 percent by weight based upon the mixture of styrene oxide. The resultant mixture has a viscosity of about 10,000 to 15,000 centipoises. The pot life of the mixture at room temperature is then about 3 to 4 hours. The mixture, when applied as a bonding agent between two sheets of sheet metal corresponding to that of a tin can, cures in 10 to 12 seconds at 180° C.

In order to test the efficacy of the above described mixture as a cement or bonding agent between two surfaces of sheet steel of the type employed in the construction of tin cans and similar sheet metal containers, two strips of the metal about 4 to 6 inches in length and 1 inch wide are coated for a distance of 1½ to 2 inches with the liquid composition and then are lightly pressed together so that the coated portions are superposed. Heat of a hot plate may be applied for 10 to 12 seconds in order to effect a cure to thermoset state. The test samples are then cooled. To give the samples a peel test, the two unbonded ends of the strip are held in an appropriate tensioning device and the ends while spread apart at an angle of 180°, are pulled apart at a steady rate of 8 inches per minute. The average pull required to peel the two pieces of metal apart is determined.

Shear strength of the cured cementing material may be determined by bonding the ends of the pieces of metal together with the uncoated portions disposed in opposite directions. After the curing operation, pull is exerted to shear the cemented portions apart.

Two sets of test samples were prepared. These were identical except that the second contained 10 percent by weight of styrene oxide. This reduces viscosity and increases pot life. The properties and the results obtained by pull tests, shear tests and solvent tests upon the cured samples are tabulated as follows:

|  | Sample 1 | Sample 2 |
|---|---|---|
| Viscosity _____ cp__ | 25,000 | 10-15,000 |
| Pot life R.T. _____ hr__ | 2 | 3-4 |
| Pot life 60° C. _____ min__ | 20 | 20-30 |
| Cure 180° C. _____ sec__ | 10-12 | 12 |
| Cure 25° C. _____ hr__ | 24 | 24 |
| Shear Tensile _____ #/sq. in__ | 5-6,000 | 5-6,000 |
| Peel Strength _____ #/in__ | 30-40 | 30-40 |
| Solvent Resistance, 60 hr. in $H_2O$ _____ | O.K. | O.K. |
| 60 hr. in Ethylene Glycol _____ | O.K. | O.K. |
| Adhesion: |  |  |
| Metal _____ | Excellent | Excellent |
| Wood _____ | Excellent | Excellent |

The tests clearly show the value of the resin blend as a bonding agent in fabricating containers and other articles. For example, the composition is excellent as a side seam cement for bonding together the joints of tin plate in containers. When so used, the material cures very rapidly to a hard, thermoset, coherent and adherent state. It exhibits excellent resistance to shear failure and peel failure; elongation is good and metal pieces bonded together thereby can be flexed to a substantial degree without breakage or fracture of the cementing material. The cured material has little or no odor and is resistant to food products, beverages and the like.

*Example II*

The techniques of this example are substantially the same as in Example I except that the organic polysulfide employed comprises a mixture of 99.5 percent by weight of bis(2-chloroethyl)formal and 0.5 percent by weight of trichloropropane. The latter is an added cross-linking agent. This mixture is treated with sodium polysulfide to provide an organic polysulfide having a molecular weight of about 4,000 and a viscosity of 35,000 to 45,000 centipoises. The product substantially corresponds to the commercial material sold as Thiokol LP–32. The blend of the polyether resin polyamide and the foregoing organic polysulfide when employed as a bonding agent for tin plate, exhibits a high bonding strength and excellent extensibility, flexibility, peel resistance and shear resistance. The composition comprising this material when cured, exhibits little or no odor or taste.

*Example III*

The polyether resin of this example corresponds to that of Example A. The polyamide resin corresponds to that of Example I. The organic polysulfide corresponds to that of Example I except that it is of a viscosity of about 35,000 to 45,000 centipoises and is known commercially as Thiokol LP–2. The interpolymerizable mixture is of the following composition:

| | Parts by weight |
|---|---|
| Allyl epoxy resin | 4 |
| Polyamide | 6 |
| Organic polysulfide resin | 1 |

This mixture cures at room temperature in a period of about 60 hours and when so cured is thermoset and exhibits an elongation of 125 percent and cures rapidly at 150° C. to 200° C. The mixture is useful for cementing tin plate, structural metal parts, aluminum, wood and other materials. It is also valuable as a caulking compound as for example for caulking the joints between the boards of a ship deck, and will adhere very firmly to the wood; but has a high degree of extensibility or stretch which permits it to yield or distort under stress without cracking or breaking and without placing excessive stress on the boards. Needless to say it is capable of wide application in caulking the joints between various materials and in many places. It is also very valuable for bonding together various combinations of unlike materials such as aluminum and plastic, iron and aluminum and many others.

*Example IV*

The thermosetting material in this example is prepared from a mixture comprising:

| | Part by weight |
|---|---|
| Allyl epoxy resin (see Example A) | 6 |
| Polyamide resin (see Example I) | 10 |
| Organic polysulfide resin (see Example III) | 1 |

The mixture cures in 60 hours at room temperature to a thermoset state and exhibits an elongation of 100 percent.

In the preceding examples, the use of 2,2-bis(4-hydroxy-3-allylphenyl)dimethylmethane as the polyhydric phenol component of the polyether resin has been indicated. It is to be understood that this compound may be replaced by other phenolic compounds containing 1 or more allyl groups or similar unsaturated side chains in the benzene rings. Such compounds, useful for reaction with epichlorohydrin to form polyether or epoxy resins adapted to be used in the practice of the present invention, may be prepared by reaction of allyl chloride or other appropriately chlorinated ethylenically unsaturated hydrocarbons with diphenols such as the following:

Bis(4-hydroxyphenl)1,1-propane
Bis(4-hydroxyphenyl)1,1-ethane
Bis(4-hydroxyphenyl)1,1-butane
Bis(4-hydroxyphenyl)2,2-butane
Bis(4-hydroxyphenyl)2,2-propane and various others.

In preparing the polyethers, various halogenated epoxides may be substituted for epichlorohydrin and being represented by the following partial list:

1-chloro-2,3-epoxy butane
1-chloro-3,4-epoxy butane
2-chloro-3,4-epoxy butane
1-chloro-2-methyl-2,3-epoxy butane
1-bromo-2,3-epoxy pentane
2-chloromethyl-1,2-epoxy butane
1-bromo-4-methyl-3,4-epoxy pentane
1-bromo-4-ethyl-2,3-epoxy pentane
4-chloro-2-methyl-2,3-epoxy pentane
2-chloro-2,3-epoxy octane
1-chloro-2-methyl-2,3-epoxy octane
1-chloro-2,3-epoxy decane and others. The techniques of forming the polyethers to form the foregoing materials substantially correspond to those already described or hereinafter described. These polyethers may be substituted for those disclosed in Examples I through IV.

The liquid mixtures of polyethers, polyamides and organic polysulfides as disclosed herein, are not limited in their application to use as cements for tin plates, but are also useful in cementing or bonding joints between contiguous surfaces of such metals as aluminum, brass, magnesium alloys and the like. Likewise, the mixtures may be employed as bonding agents between surfaces of wood, stone, plastic and other materials. As previously implied, they are also useful for bonding together unlike materials such as aluminum and plastics such as nylon; or iron and aluminum, or melamine resins and interpolymers of monomers containing $>C=CH_2$ groups and polyesters of dihydric alcohols and alpha-beta ethylenic dicarboxylic acids and many others.

The mixtures are further useful as coating agents for tin plate, aluminum, wood and other materials which it may be desired to protect or decorate by application of appropriate coatings. The mixtures may be applied to the surfaces to be coated and then cured by appropriate exposure at room temperature or more elevated temperatures below the temperature of the decomposition of the resin components or their interpolymer products.

For a better understanding of the application of the invention in bonding the seams in such articles as containers, reference may now be had to the accompanying drawings in which like numerals refer to like parts throughout and in which.

Figure 1:
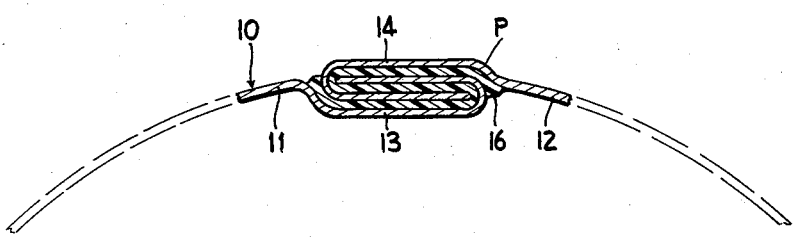
Fig. 1 is a fragmentary sectional view through a joint such as that between the edges of the walls of the tin plate in a conventional tin can or similar container.

In the drawings, the proportions do not necessarily correspond to those in an article actually embodying the invention but are intended merely for purposes of illustration.

In the embodiment of the invention as shown in Fig. 1, the walls of a container or a similar article are fragmentarily indicated at 10. These walls may be unitary, comprising a sheet of steel such as so-called tin plate with or without an actual surface coating of tin or other metal and being bent around in a circle, a square or other configuration so that the edge upon one side 11 is juxtaposed to the edge on the other side 12. The edge portions are bent to a crimped or hooked configuration as indicated at 13 and 14 and the hooked portions are interlocked in order to obtain a high degree of mechanical strength against bursting pressures even without the use of a cementing agent. In this construction, the interlocked surfaces are appropriately coated as at 16 and bonded together by a cementitious agent comprising a cured mixture of (1) a polyether resin, (2) a polyamide, and (3) an organic polysulfide adherent to the metal. The composition may for example correspond to that disclosed in any one of the preceding examples.

Figure 2:
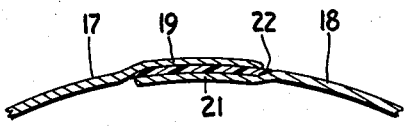
Fig. 2 is a fragmentary sectional view through a second type of joint between the edges of the metal constituting a container.

In the embodiment of the invention as disclosed in Fig. 2 of the drawings, portions 17 and 18 of sheet material such as sheet metal may be separate individual pieces of metal joined together or may comprise a single sheet of metal bent around to bring opposed edges into juxtaposed position. The edge portions, as indicated at 19 and 21, are overlapped and a thin, adherent layer of mixture of a polyether resin, a polyamide resin and an organic polysulfide resin, as indicated at 22 is interposed and cured to provide a strong, thermoset, resistant bond between the two edges. In the construction, the two edge portions, it will be observed, are merely overlapped without the actual mechanical crimping or hooking disclosed in Fig. 1. For many constructions, the mechanical resistance of this joint to tension or to other forces is quite adequate without actual crimping together of the edges.

In the embodiments of the invention as illustrated in Figs. 1 and 2, the compositions are indicated as constituting a so-called side seam cement. It is obvious that the use of the compositions of this invention are not limited to this particular application. They may for example, be employed in the joints between the bottom or top of a conventional tin can type container and the side walls. It is also manifest that the material as disclosed herein may be employed as a bonding agent in the joints of the sheet metal employed in the construction of airplane wings, fuselages, and other portions of airplane construction. These are but illustrative uses. When the bonding agents herein disclosed are so employed, the joints may be further reinforced, if desired, by means of rivets or other conventional securing devices. These added securing devices usually are not required.

In forming the joints between the edges of a plurality of sheets of metal, or between a plurality of edges of the same sheet which is so bent that the edges to be bonded are juxtaposed, various techniques may be employed. Thus, those portions of previously cut blank to be coated may first receive a layer of the liquid but thermosetting blend or mixture of the three resins. The coated portions to be cemented together may be brought together immediately or after a dwell affording time for partial cure of the mixture. The parts may be mechanically secured together as by hooking or crimping as in Fig. 1 or by other mechanical means. They may also be coated and merely overlapped as in Fig. 2. They may then be held together as by suitable clamping means until the mixture has cured to a hard, adherent and coherent state. The clamping means may then be released.

The application of the liquid cementing material may be by extrusion of a stream or jet upon the surfaces to be bonded together, or by roller coating, or by spraying, or by dipping the edges involved. It is within the purview of the invention to coat a large sheet or blank of material capable of forming a plurality of finished containers or other units, in an appropriate pattern and then to shear out individual blanks along the pattern of the coating. The edges to be secured are then brought together and the cementing mixture is cured, as for example by heating the container at a suitable temperature, e.g. 160° C. to 200° C. for an appropriate period of time, e.g. 6 to 20 seconds. The joints thus formed will resist the various operations involved in the processing of foods and beverages. Containers may be coated completely within and/or without with the foregoing resin. Coating may be performed upon a sheet of tin plate which is subsequently cut up and formed into containers; or the blanks may be coated before they are formed into containers. The formed containers may also be coated with the material. The high extensibility or flexibility of many of the thermoset compositions, coupled with the high cohesion and adhesion of the material is a great advantage in many processes of fabricating containers.

I claim:

1. As a new composition of matter, a liquid mixture of (A) an epoxy resin which is formed by reaction of a bis(4-hydroxy - 3 - allylphenyl)-dimethylmethane and an epihalohydrin; (B) a liquid polyamide resin of a molecular weight of about 3,000 to 10,000, which is a reaction product of an ethylene polyamine and a dimer acid from a drying oil acid containing about 36 carbon atoms; and (C) a liquid organic polysulfide polymer which is the reaction product of bis(2-chloroethyl)formal and an alkali metal polysulfide.

2. As a new composition of matter, a mixture of (A) an epoxy resin which is formed by reaction of epichlorohydrin and a compound of the formula:

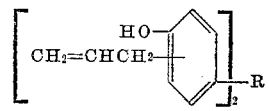

in which R is alkylidene radical of 2 to 4 carbon atoms in chain length; (B) a liquid polyamide resin which is of a molecular weight of about 3,000 to 10,000 and which is a reaction product of an ethylene polyamine and a dimer acid of about 36 carbon atoms chain length; and (C) a polysulfide resin formed by reaction of bis-(chloroethyl)formal and sodium polysulfide, the components of the mixture being in the proportions:

|  | Parts by weight |
|---|---|
| (A) Epoxy resin | 5 |
| (B) Polyamide resin | 1 to 10 |
| (C) Polysulfide resin | 0.2 to 6 |

3. The method of preparing a new composition of matter useful as an adhesive, which comprises forming a mixture of a liquid polyamide resin of a molecular weight of about 3,000 to 10,000 and which is a reaction product of ethylene diamine and a dimer acid from addition reaction of a drying oil acid, said dimer acid containing about 36 carbon atoms; and a liquid polysulfide resin formed by reaction of bis(chloroethyl)-formal and sodium polysulfide, whereby to provide a first package, and mixing this package with a second package which is of an epoxy resin formed by reaction of epichlorohydrin and bis(4-hydroxy-3-allylphenyl)-dimethylmethane, the proportions of the components of the mixture being:

|  | Parts by weight |
|---|---|
| Epoxy resin | 5 |
| Polyamide resin | 1 to 10 |
| Polysulfide resin | 0.2 to 6 |

4. The composition as defined in claim 1 in which the epoxy resin is the reaction product of bis(4-hydroxy-allylphenyl)dimethylmethane and epichlorohydrin.

5. A composition as defined in claim 1 in which the mixture contains about 10 percent by weight based upon the mixture, of styrene oxide.

6. A composition as defined in claim 1 in which the dimeric, fatty acid is of linoleic acid.

7. The method of uniting two bodies of ferrous metal together which comprises interposing between contiguous surfaces of the bodies to be joined a liquid mixture of the material defined in claim 1, and curing the mixture.

8. A product formed by curing the material of claim 1 at a temperature of about 180° C.

References Cited in the file of this patent

UNITED STATES PATENTS

| 2,365,112 | Schrader et al. | Dec. 12, 1944 |
| 2,471,500 | Stewart et al. | May 31, 1949 |
| 2,705,223 | Renfrew et al. | Mar. 29, 1955 |
| 2,789,958 | Fettes et al. | Apr. 23, 1957 |
| 2,798,833 | Lapsensohn et al. | July 9, 1957 |

OTHER REFERENCES

Jorczak et al.: India Rubber World, April 1954, pp. 66–69.